United States Patent
Lin et al.

(10) Patent No.: US 9,977,200 B2
(45) Date of Patent: May 22, 2018

(54) OPTICAL COMPONENT ASSEMBLY WITH A VERTICAL MOUNTING STRUCTURE FOR MULTI-ANGLE LIGHT PATH ALIGNMENT AND AN OPTICAL SUBASSEMBLY USING THE SAME

(71) Applicant: Applied Optoelectronics, Inc., Sugar Land, TX (US)

(72) Inventors: Kai-Sheng Lin, Sugar Land, TX (US); Chong Wang, Stafford, TX (US); Justin Lii, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days. days.

(21) Appl. No.: 15/252,702

(22) Filed: Aug. 31, 2016

(65) Prior Publication Data
US 2018/0059340 A1    Mar. 1, 2018

(51) Int. Cl.
*G02B 6/42* (2006.01)
*G02B 6/293* (2006.01)
(Continued)

(52) U.S. Cl.
CPC ......... *G02B 6/4244* (2013.01); *G02B 6/2938* (2013.01); *G02B 6/29362* (2013.01);
(Continued)

(58) Field of Classification Search
None
See application file for complete search history.

(56) References Cited

U.S. PATENT DOCUMENTS 6,118,912 A * 9/2000 Xu .................. G02B 6/29367
385/24
7,450,858 B2   11/2008 Verdiell
(Continued)

FOREIGN PATENT DOCUMENTS

JP        2004-12844 A  * 1/2004
KR  10-2006-0066256 A  * 6/2006

OTHER PUBLICATIONS

PCT Search Report and Written Opinion dated Sep. 29, 2017, received in related PCT Application No. PCT/US17/49311, 12 pgs.
(Continued)

*Primary Examiner* — Mike Stahl
(74) *Attorney, Agent, or Firm* — Grossman Tucker Perreault & Pfleger, PLLC; Norman S. Kinsella

(57) ABSTRACT

In an embodiment, an optical component assembly is disclosed and is configured to be at least partially disposed within at least one first opening of an optical subassembly housing. The at least one optical component assembly comprising a base extending from a first end to a second end along a longitudinal axis, and a vertical mount disposed on the base and including a first surface that provides a mounting region to couple to an optical component, the first surface defining a vertical axis that extends substantially upright from the base and a horizontal axis that is angled relative to the longitudinal axis of the base at a first angle, the vertical mount further providing a channel that extends through the vertical mount, wherein the channel provides an optical pathway angled relative to the first surface at the first angle, the first angle being substantially between about 15 and 75 degrees.

18 Claims, 7 Drawing Sheets

(51) Int. Cl.
  *G02B 27/10* (2006.01)
  *G02B 7/00* (2006.01)
(52) U.S. Cl.
  CPC ......... *G02B 6/4206* (2013.01); *G02B 6/4215* (2013.01); *G02B 6/4219* (2013.01); *G02B 6/4246* (2013.01); *G02B 7/006* (2013.01); *G02B 27/1006* (2013.01)

(56) References Cited

U.S. PATENT DOCUMENTS

| | | | |
|---|---|---|---|
| 7,583,900 B2 | 9/2009 | Dallesasse et al. | |
| 7,703,992 B2 * | 4/2010 | Pfnuer | G02B 6/4206 385/90 |
| 7,945,169 B2 | 5/2011 | Oki et al. | |
| 8,985,871 B2 | 3/2015 | Mizobuchi et al. | |
| 8,995,845 B2 | 3/2015 | Du et al. | |
| 9,250,401 B2 | 2/2016 | Lim et al. | |
| 9,350,454 B2 | 5/2016 | Xu et al. | |
| 9,391,709 B2 | 7/2016 | Tamura et al. | |
| 9,684,141 B1 * | 6/2017 | Ho | G02B 6/4244 |
| 2001/0028765 A1 * | 10/2001 | Toratani | G02B 6/29358 385/39 |
| 2003/0063844 A1 * | 4/2003 | Caracci | G02B 6/29362 385/24 |
| 2008/0193135 A1 * | 8/2008 | Du | G02B 6/29362 398/88 |
| 2011/0058771 A1 | 3/2011 | Lee et al. | |
| 2013/0108262 A1 * | 5/2013 | Lim | G02B 6/4215 398/43 |
| 2015/0153522 A1 * | 6/2015 | Nakagawa | G02B 6/4215 385/31 |
| 2016/0050019 A1 * | 2/2016 | Gothoskar | H04B 10/40 398/135 |

OTHER PUBLICATIONS

PCT Search Report and Written Opinion dated Sep. 21, 2017, received in corresponding PCT Application No. PCT/US17/49305, 10 pgs.
U.S. Office action dated Nov. 3, 2017, received in related U.S. Appl. No. 15/252,743, 18 pgs.
U.S. Office Action dated May 3, 2017, received in U.S. Appl. No. 15/252,743, 14 pgs.
Office Action dated Nov. 3, 2017 in related U.S. Appl. No. 15/252,743, filed Aug. 31, 2016, 18 pages.

* cited by examiner

US 9,977,200 B2

OPTICAL COMPONENT ASSEMBLY WITH A VERTICAL MOUNTING STRUCTURE FOR MULTI-ANGLE LIGHT PATH ALIGNMENT AND AN OPTICAL SUBASSEMBLY USING THE SAME

CROSS-REFERENCE TO RELATED APPLICATIONS

The present application is related to co-pending U.S. patent application Ser. No. 15/252,743 titled "Techniques for Reducing Electrical Interconnection Losses Between a Transmitter Optical Subassembly (TOSA) and Associated Driver Circuitry and an Optical Transceiver System Using the Same," filed on Aug. 31, 2016, the entire disclosure of which is incorporated herein by reference.

TECHNICAL FIELD

The present disclosure generally relates to optical transceiver modules, and more particularly, to an optical component assembly having a vertical mounting structure that allows for a wide-range of incident angles to accommodate different light path configurations within an optical subassembly housing.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As optical transceiver housings scale down in size, the complexity of designing and manufacturing TOSAs and ROSAs to fit within the constrained housings, without sacrificing channel allocation and transceiver performance, continues to increase and raises numerous non-trivial issues.

BRIEF DESCRIPTION OF THE DRAWINGS

These and other features and advantages will be better understood by reading the following detailed description, taken together with the drawings wherein.

Figure 1:
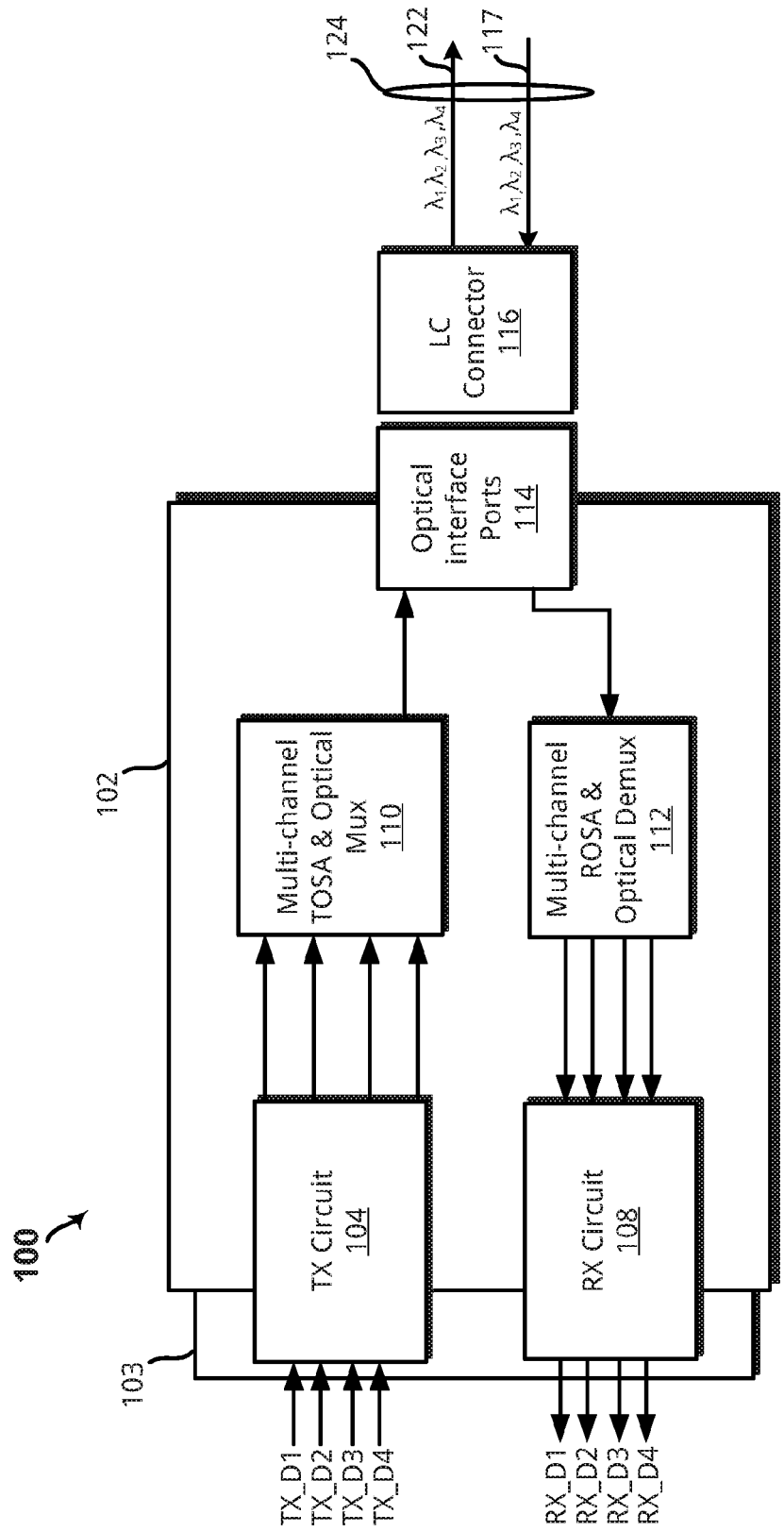
FIG. 1 schematically illustrates an embodiment of an optical transceiver module including a multi-channel transmitter optical sub-assembly (TOSA) arrangement and multi-channel receiver optical sub-assembly (ROSA).

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Increased demand for high-speed optical transceivers, largely due to the adoption of network standards such as IEEE 802.3bm-2015 and others that prescribe 100 Gigabit Ethernet (100 GbE) and beyond, raises non-trivial challenges in the design of optical subassembly modules. For example, in optical subassemblies, such as transmitter optical subassemblies (TOSAs) and receiver optical subassemblies (ROSAs), multiple optical component assemblies are coupled to openings of a respective housing, with the optical component assemblies having varying dimensions and configurations in order to transmit and receive signals having multiple channel wavelengths. To support ROSA/TOSA operation, differing shapes and configurations for optical component assemblies may be employed in order to provide different incident angles for reflecting and/or filtering light according to design constraints. Stated differently, the design of a TOSA/ROSA often requires light to be directed in a manner that allows for multiplexing or demultiplexing of a signal, as the case may be. Therefore, the design and manufacture of optical subassemblies often includes selecting optical subassemblies that provide an appropriately angled mirror, filter, or other optical element to control the path of light to achieve a desired power/sensitivity. That being said, manufacturers often produce multiple different types of optical component assemblies for a single optical subassembly design, with each optical component assembly varying in shape, size and mirror/filter angle, for example. This unfortunately results in increased manufacturing costs, production times, and production complexity.

Thus, the present disclosure is directed to an optical component assembly with a vertical mounting structure that extends substantially perpendicular from a base of the optical component assembly and is configured to provide a first surface, which may also be referred to as a mounting surface, to couple to an optical component (or optical element) such as a filter, mirror, laser diode, lens, diffuser, polarizer, prism, beam splitter, diffraction grating, and any other suitable active or passive optical component. The first surface may be substantially planar and include a vertical axis that extends substantially perpendicular from the base and a horizontal axis that extends transverse to the vertical axis. Once coupled to the vertical mounting surface, the optical component has a fixed orientation relative to the base. The fixed orientation provides a focal axis for the optical component that is also fixed relative to a longitudinal axis of the base. Thus, the orientation of the optical component may be described as being fixed relative to the base once coupled to the vertical mounting structure.

The base of the optical component assembly may further include a so-called "keyed" (or asymmetric) shape whereby an associated opening of an optical subassembly housing includes a corresponding keyed shape to receive the base in a single orientation, and thus, reduces or otherwise eliminates the potential for an optical component assembly to be inserted in an improper manner. Therefore, the physical orientation of the opening of an optical subassembly housing determines the optical orientation of the optical component relative to one or more light paths provided by the housing. That is, the physical orientation of the opening may be configured to provide a predetermined angle of incidence between an optical component, e.g., an optical filter, and an intersecting light path. Accordingly, the predetermined angle of incidence may cause one or more channel wavelengths traveling along the intersecting light path to reflect along a second light path, with the second light path being substantially orthogonal to the intersecting light path. Simply stated, the orientation of an opening of an optical subassembly housing may be chosen to provide a range of selectable angles for the vertically-mounted optical component relative to an associated light path to direct light according to design constraints without necessarily modifying the physical structure of the optical subassembly itself.

In some cases, an optical component assembly may be configured with a light channel or guide that extends through the vertical mounting structure along the optical axis of a vertically-mounted optical component. The light channel may be enclosed or partially enclosed to provide a light-concentrating aperture, although other embodiments are within the scope of this disclosure. To this end, the optical component assembly may be configured to selectively reflect specific channel wavelengths, e.g., based in part on orientation provided by an opening of an optical subassembly housing, while allowing others to pass through, e.g., to provide short-pass and/or long-pass filtering. Thus, an optical subassembly such as a ROSA/TOSA may include multiple optical component assemblies coupled to respective openings of an optical subassembly housing, with the openings configured to provide an orientation for each optical component assembly to support one or more desired light paths.

In the context of a TOSA, the optical component assemblies may then collectively define a multiplexing arrangement to support receiving different channel wavelengths via multiple different respective light paths (e.g., input light paths associated with laser diodes) in order to provide the same along a first light path as a multiplexed signal, e.g., a wavelength division multiplexed (WDM) signal. The first light path may be, for instance, coupled to an external fiber for transmission of a signal having the multiple different channel wavelengths. Alternatively, the first light path may be coupled to a transmit fiber via a second light path that is substantially orthogonal to the first light path by way of an optical component assembly having an orientation configured to receive the multiplexed signal along the first light path and then direct/launch the same along the second light path. One such example orthogonal light path arrangement for a TOSA is discussed in further detail below with regard to the example embodiment of FIG. 6. In any event, a wide-range of desired light path configurations may be achieved using the optical component assembly variously disclosed herein without the cost and complexities associated with designing and maintaining various different types of optical component assemblies for each optical subassembly design.

While aspects and embodiments disclosed herein specifically reference a TOSA, the techniques are also equally applicable to other subassemblies such as ROSAs. Moreover, the aspects and embodiments disclosed herein are applicable to any other optical subassembly that seeks to implement different light path arrangements for multiplexing/demultiplexing of a light signal without the cost and complexity associated with designing and implementing numerous optical component assembly configurations that may be compatible with only to a single or small number of housings/designs.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid.

As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers to any optical connection that allows light to be imparted from one element to another without the use of an intermediate device such as a fiber.

As used herein singular expressions such as "a," "an," and "the" are not limited to their singular form, and are intended to cover the plural forms as well unless the context clearly indicates otherwise.

From time to time one or more aspects of the present disclosure may be described using ranges. In such instances it should be understood that the indicated ranges are exemplary only unless expressly indicated otherwise. Moreover, the indicated ranges should be understood to include all of the individual values of falling within the indicated range, as though such values were expressly recited. Moreover, the ranges should be understood to encompass sub ranges within the indicated range, as though such sub ranges were expressly recited. By way of example, a range of 1 to 10 should be understood to include 2, 3, 4 . . . etc., as well as the range of 2 to 10, 3 to 10, 2 to 8, etc., as though such values and ranges were expressly recited.

Example Optical Transceiver Module

Referring to FIG. 1, schematically illustrates an optical transceiver module including a multi-channel transmitter optical sub-assembly (TOSA) arrangement and multi-channel receiver optical sub-assembly (ROSA) arrangement. An optical transceiver 100 transmits and receives four (4) channels using four different channel wavelengths ($\lambda_1$, $\lambda_2$, $\lambda_3$, $\lambda_4$). The optical transceiver 100 may be capable of transmission rates of at least about 25 gigabits (Gbs) per channel or more. In one example, the channel wavelengths $\lambda_1$, $\lambda_2$, $\lambda_3$, $\lambda_4$ may be 1270 nm, 1290 nm, 1310 nm, and 1330 nm, respectively. The optical transceiver 100 may also be capable of both short transmission distances of tens of meters, for example, to distances of 2 kilometers or more. The optical transceiver 100 may be used, for example, in internet data center applications or fiber to the home (FTTH) applications. In an embodiment, the optical transceiver 100 implements a Quad Small Form-Factor Plugging (QSFP) transceiver. For example, the optical transceiver 100 may be implemented within a QSFP receiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP or QFSP+ transceivers. The optical transceiver 100 may be configured for dense wavelength division multiplexing (DWDM) or course wavelength division multiplexing (CWDM), depending on a desired configuration. Although aspects and scenarios disclosed herein discuss a four (4) channel configuration, other channel configurations, e.g., 2, 4, 16, 32, and so on, are within the scope of this disclosure.

As shown, the optical transceiver 100 includes a transceiver housing 102 and two optical subassemblies, namely a multi-channel TOSA arrangement 110 and a multi-channel ROSA arrangement 112. The multi-channel TOSA arrangement 110 may be configured for transmitting optical signals on different channel wavelengths, and the multi-channel ROSA arrangement 112 for receiving optical signals on different channel wavelengths. The optical transceiver 100 further includes a transmit connecting circuit 104 and a receive connecting circuit 108. The transmit connecting circuit 104 and the receive connecting circuit 108 provide electrical connections at least to the multi-channel TOSA arrangement 110 and the multi-channel ROSA arrangement 112, respectively, within the transceiver housing 102. The transmit connecting circuit 104 and the receive connecting circuit 108 may communicate with external systems via data bus 103. For example, data bus 103 is a 38-pin connector that comports with physical connector QSFP standards and data communication protocols.

Figure 2A:
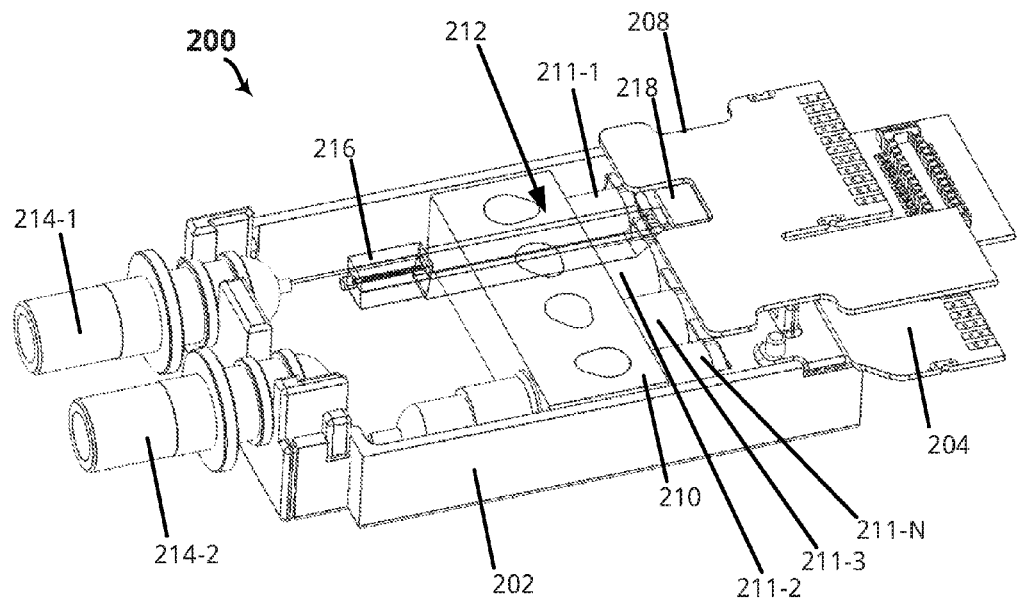
FIG. 2A is a perspective view of an example small form-factor (SFF) pluggable transceiver with a multi-channel arrangement TOSA configuration and a multi-channel arrangement ROSA, in accordance with an embodiment of the present disclosure.

Continuing on with FIG. 1, the transmit connecting circuit 104 is electrically coupled to the electronic components in the multi-channel TOSA arrangement 110, e.g., laser assemblies 211-1 to 211-N (as shown in FIG. 2A) the receive connecting circuit 108 is electrically coupled to the electronic components in the multi-channel ROSA arrangement 112. The multi-channel ROSA arrangement 112 may include an array waveguide grating (AWG), detectors, amplification circuitry and so on. The transmit connecting circuit 104 and the receive connecting circuit 108 include at least conductive paths to provide electrical connections, and may also include additional circuitry. The multi-channel TOSA arrangement 110 transmits and multiplexes multiple different channel wavelengths, and may be coupled to an optical interface port 114. The optical interface port 114 may include an LC connector port, although other connector types are also within the scope of this disclosure.

In cases where the optical interface port 114 includes a duplex, or bi-directional, LC receptacle, the LC connector receptacle provides optical connections to the multi-channel TOSA arrangement 110, and provides optical connections to the multi-channel ROSA arrangement 112. The LC connector receptacle may be configured to receive and be coupled to a mating LC connector 116 such that a transmit optical fiber 122 of an external fibers 124 optically couples to the multi-channel TOSA arrangement 110, and a receive optical fiber 117 of the external fibers 124 optically couples to the multi-channel ROSA arrangement 112.

The multi-channel TOSA arrangement 110 may include multiple laser packages and optics for producing associated channel wavelengths, and may couple the same into the transmit optical fiber 122. In particular, the lasers in the multi-channel TOSA arrangement 110 can convert electrical data signals (TX_D1 to TX_D4) received via the transmit connecting circuit 104 into modulated optical signals transmitted over the transmit optical fiber 122. Each of the laser packages may include, for example, distributed feedback (DFB) lasers. For example, each laser package may include an edge emitting DFB laser configured to produce a particular channel wavelength. In other cases, each of the laser packages may include electro-absorption modulated laser (EML) laser diode packages. The multi-channel TOSA arrangement 110 may also include monitor photodiodes for monitoring the light emitted by the lasers. The multi-channel TOSA arrangement 110 may further include one or more temperature control devices, such as a resistive heater and/or a thermoelectric cooler (TEC), for controlling a temperature of the lasers, for example, to control or stabilize the laser wavelengths.

Referring to FIG. 2A, the optical transceiver 100 is shown as an optical transceiver 200 implementing the QSFP+ specification, or other applicable pluggable small-form factor specification. To this end, and in an embodiment, the optical transceiver 200 may be compliant with the QSFP28 MSA standard, and may include physical dimensions that conform to the SFF-8661 specification. In other cases, the optical transceiver 200 may implement the C form-factor pluggable (CFP) standard. In any such cases, the optical transceiver 200 may be configured to transmit and receive at a line rate of at least 100 Gb/s, respectively. This may be particularly advantageous when using the optical transceiver in, for example, a 100GBASE-LR4 application, per the IEEE 802.3bx standards.

The optical transceiver 200 includes a transceiver housing 202 and a multi-channel TOSA arrangement 210 disposed within a region of the transceiver housing 202. The multi-channel TOSA arrangement 210 includes a plurality of laser packages 211-1 to 211-N configured to generate associated channel wavelengths and associated circuitry. The multi-channel TOSA arrangement 210 is discussed in greater detail below with regard to FIGS. 3-6. The multi-channel TOSA arrangement 210 electrically couples to the transmit connecting circuit 204 and also couples to an optical interface port 214-1 of the transceiver housing 202 by way of a waveguide device such as an optical fiber (not shown). The transmit connecting circuit 204 may be implemented as a printed circuit board (PCB) or any other suitable substrate for supporting the transmit connecting circuit 204.

The optical transceiver 200 further includes a multi-channel ROSA arrangement 212 disposed within a region of the transceiver housing 202. The multi-channel ROSA arrangement 212 may include an demultiplexing device, such as arrayed waveguide grating (AWG) device 216, photodetectors (not shown), and amplification and conversion circuitry such as a transimpedance amplifier (TIA) 218. The AWG device 216 can be compatible with channel spacing configurations that comport with, for example, 25 nm IEEE LX-4 grids, 20-nm ITU G.694.2 CWDM grids, and a range of ITU G.694.1 DWDM grids in the range of 400 Ghz to 800 Ghz (e.g., 2 nm to 4 nm). The ROSA arrangement 212 electrically is coupled to a receive connecting circuit 208, and optically coupled to an optical interface receptacle 214-2 at an end of the transceiver housing 202 by way of a waveguide device such as an optical fiber (not shown). The receive connecting circuit 208 may be configured as a PCB, for example, although other embodiments are within the scope of this disclosure. The multi-channel ROSA arrangement 112 may use the detectors and the associated circuitry 218 (e.g., a TIA) to detect, amplify and convert de-multiplexed channel wavelengths and may provide the same as electrical data signals, e.g., RX_D1 to RX_D4.

In an embodiment, the plurality of laser packages 211-1 to 211-N each includes, for example, distributed feedback (DFB) laser diode package. Other laser types are also within the scope of this disclosure such as, for example, other directly modulated laser (DML) diodes and TO can-type laser diodes. The particular laser type chosen may be based on a desired application. For instance, applications that require long-distance, e.g., about 10 km or greater, may favor EML lasers. Conversely, applications requiring shorter distances may use DMLs. In any event, and in accordance with an embodiment, each laser package 211-1 to 211-N of the multi-channel TOSA arrangement 210 can be configured to transmit at about 25 Gb/s, or greater. Each laser package 211-1 to 211-N of the multi-channel TOSA arrangement 210 may provide a relatively narrow spectrum of channel wavelengths such as a single channel wavelength, or may be configured to provide a broad spectrum of channel wavelengths based on associated optics. In an embodiment, the lasers can provide center wavelengths 375 nm to 1650 nm, for example.

Figure 2B:
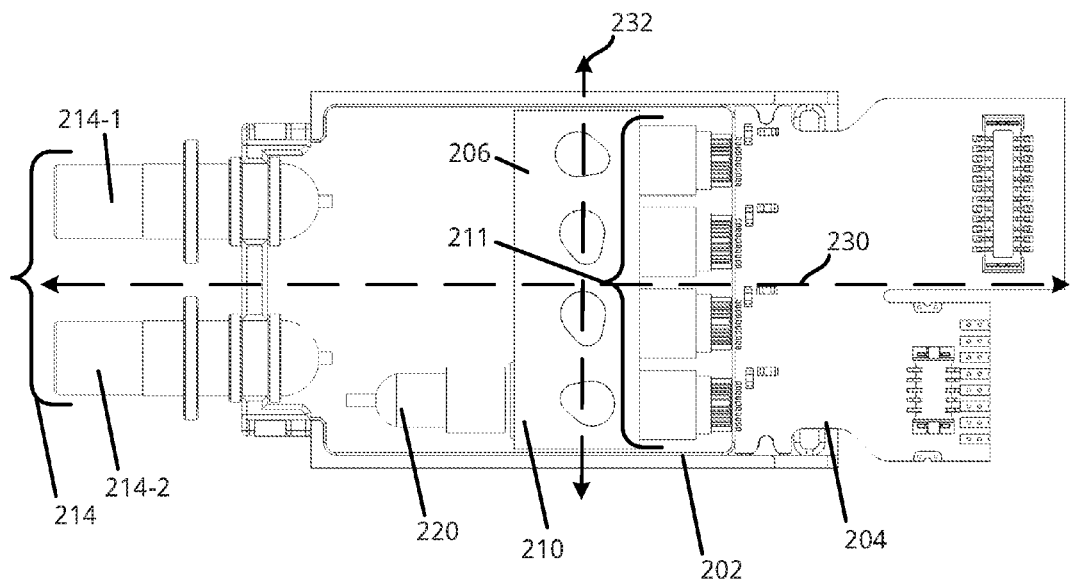
FIG. 2B shows a top plan view of the example SFF pluggable transceiver of FIG. 2A, in accordance with an embodiment of the present disclosure.

Turning to FIG. 2B, a top plan view of the optical transceiver 200 is shown in accordance with an embodiment of the present disclosure. For the purpose of clarity and practicality, FIG. 2B omits the multi-channel ROSA arrangement 112. As shown, the multi-channel TOSA 210 is shown in a perpendicular orientation relative to the longitudinal axis 230 of the transceiver housing 202. In more detail, the multi-channel TOSA 210 includes a housing 206 defined by a plurality of sidewalls 306-1 to 306-6, which are shown and described greater detail below with regard to FIG. 3. The housing 206 of the multi-channel TOSA 210 is disposed adjacent to the transmit connecting circuit 204.

Figure 3:
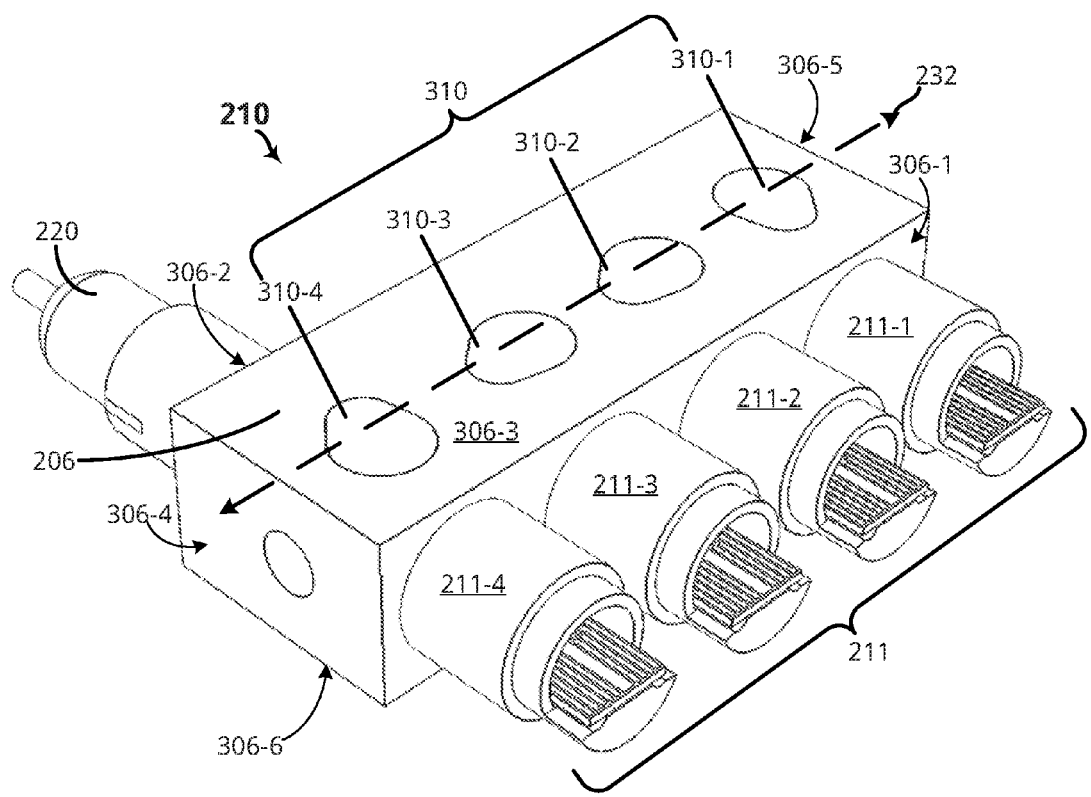
FIG. 3 shows a perspective view of the multi-channel arrangement TOSA of FIGS. 2A and 2B, in accordance with an embodiment of the present disclosure.

Turning to FIG. 3, the multi-channel TOSA 210 is shown isolated from the optical transceiver 200 for the purposes of clarity and practicality. In an embodiment, the multi-channel TOSA 210 may include a plurality of sidewalls 306-1 to 306-6, which may also be referred to as a first sidewall 306-1, a second sidewall 306-2, a third sidewall 306-3, a fourth sidewall 306-4, a fifth sidewall 306-5 and a sixth sidewall 306-6, respectively. The first and second sidewalls 306-1 and 306-2 are disposed opposite each other with at least the third sidewall 306-3 adjoining the two. The fourth and fifth sidewalls 306-4 and 306-5 define a first and second end, respectively, with the first and second sidewalls 306-1 and 306-2 extending between the two along the longitudinal center line 232.

In this embodiment, the first sidewall 306-1 may include the plurality of laser assemblies collectively indicated at 211 and individually indicated as laser assemblies 211-1 to 211-4. As discussed in greater detail below, each of the laser assemblies 211-1 to 211-4 may be configured to generate a specific channel wavelength. For example, the laser assembly 211-1 may be configured to emit 1330 nm channel wavelengths, the laser assembly 211-2 may be configured to emit 1310 nm channel wavelengths, the laser assembly 211-3 may be configured to emit 1290 nm channel wavelengths, and the laser assembly 211-4 may be configured to emit 1270 nm channel wavelengths. Other configurations for the laser assemblies are also within the scope of the disclosure and the aforementioned examples are not meant to be limiting. Continuing on, the second sidewall 306-2 is coupled to an optical coupling receptacle, such as the LC receptacle 220. The third sidewall 306-3 is coupled to a plurality of optical components 310-1 to 310-4 that collectively form multiplexing optics and are discussed in greater detail below with reference to FIG. 4.

Figure 4:
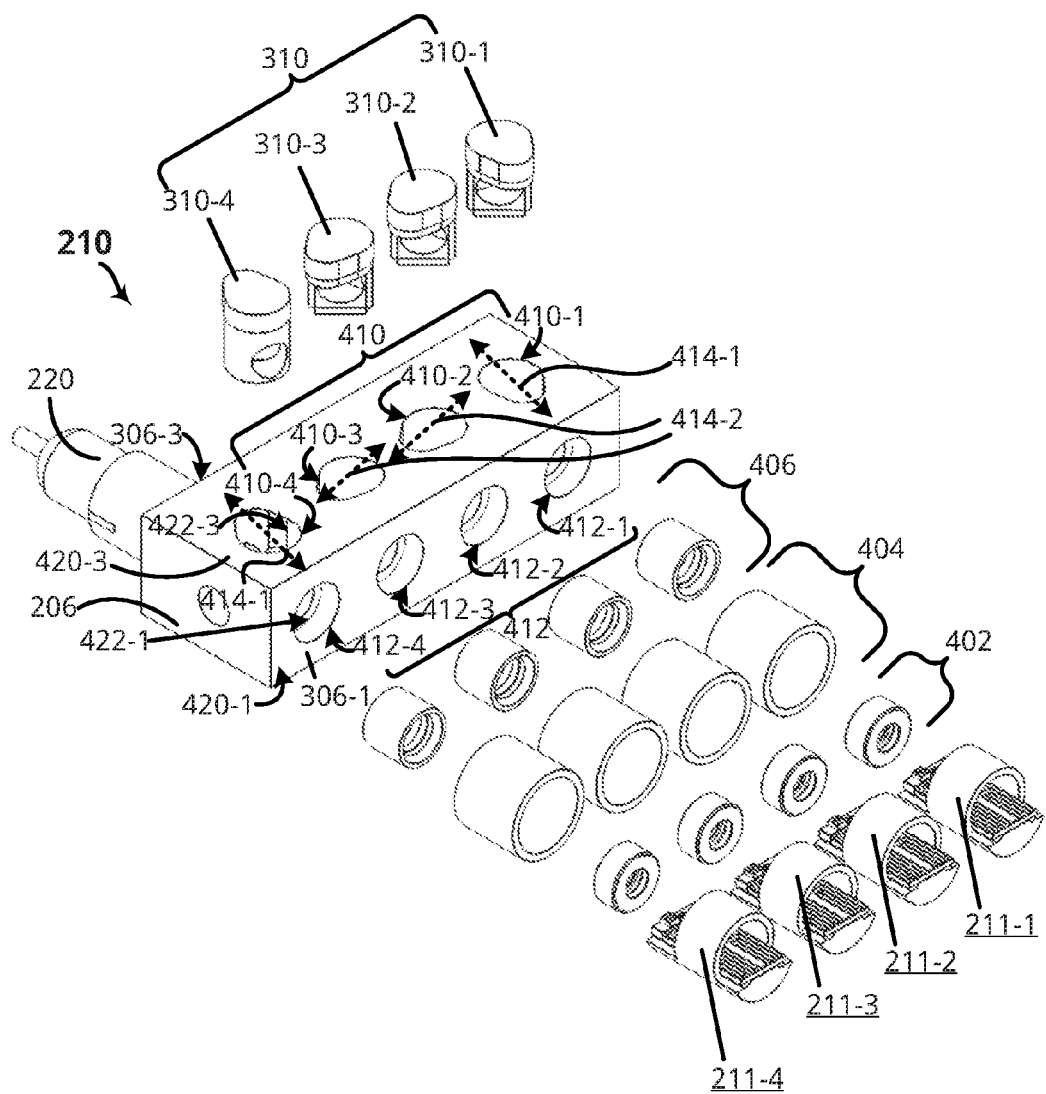
FIG. 4 shows an exploded view of the multi-channel arrangement TOSA of FIG. 3 in accordance with an embodiment of the present disclosure.

Turning to FIG. 4, the multi-channel TOSA arrangement 210 of FIG. 3 is shown in an exploded view in accordance with an embodiment of the present disclosure. The housing 206 of the multi-channel TOSA arrangement 210 includes a plurality of first openings 410 (e.g., 410-1 to 410-4) and a plurality of second openings 412 (e.g., 412-1 to 412-4). As shown, the first openings 410 are defined on the third sidewall 306-3, and the second openings 412 are defined on the first sidewall 306-1.

Figure 6:
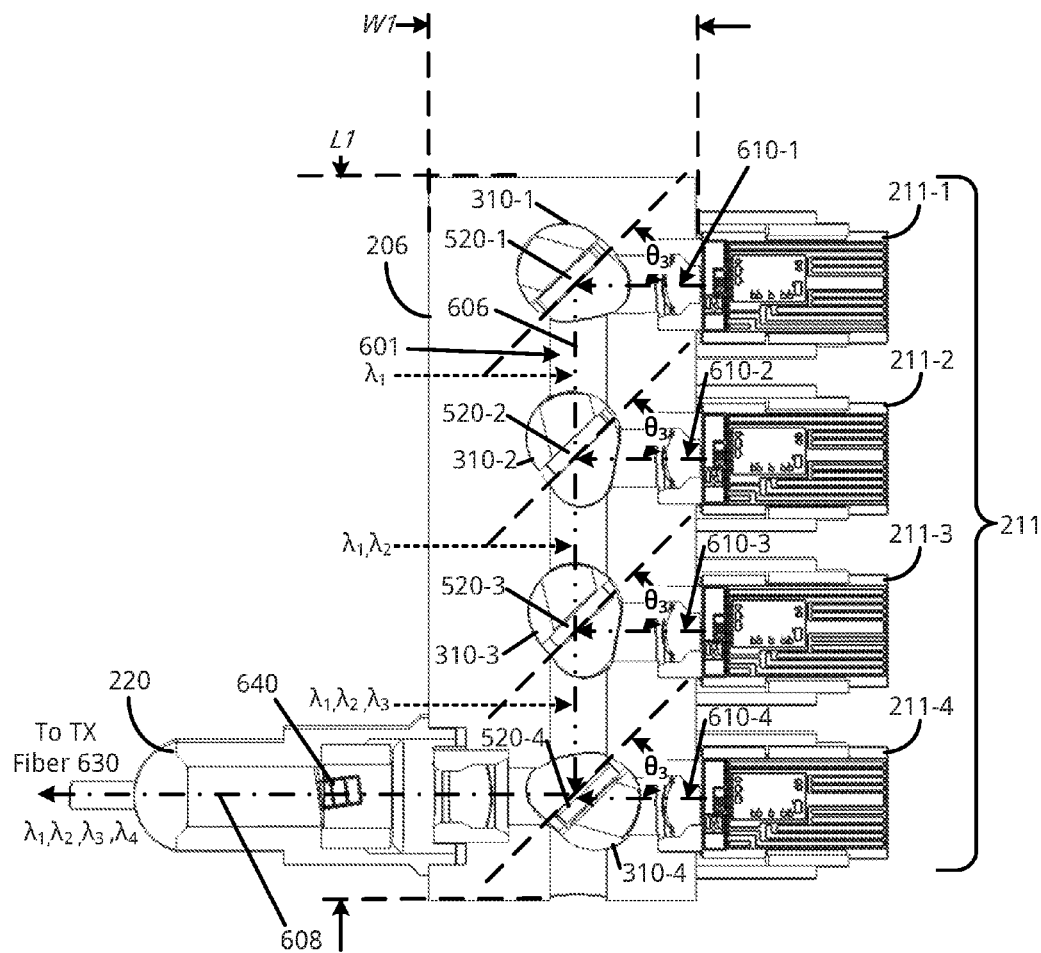
FIG. 6 shows a cross-sectional view of the multi-channel arrangement TOSA of FIG. 3 in accordance with an embodiment of the present disclosure.

Each of the plurality of first openings 410 is defined at least in part by a surface of the third sidewall 306-3, such as surface 422-3, that extends from the outer side wall 420-3 into a cavity 601 (FIG. 6). Each plurality of first openings 410 may be coupled to a respective one of a plurality of optical components assemblies 310-1 to 310-4. In this embodiment, the first openings 410 are each formed by the third sidewall 306-3, although other embodiments are within the scope of this disclosure. The plurality of first openings 410 may have substantially similar shape, but at least some of the first openings 410 have different orientations. For example, and as shown, the first opening 410-1 includes a first orientation with a longitudinal axis 414-1. The second opening 410-2 includes a second orientation with a longitudinal axis 410-2. The first orientation of the first opening 410-1 is different from that of the second orientation of the second opening 410-2 as respective longitudinal axis 414-1 and 414-2 are substantially orthogonal. As further shown, the orientation of the opening 410-4 is substantially reversed to that of the first opening 410-1 (e.g., a mirror image), and the orientation of the second and third openings 410-2 and 410-3 are substantially the same.

Continuing on with FIG. 4, the second openings 412 may also be accurately referred to as light input coupling ports. Each of the second openings 412 are defined at least in part by a surface of the first sidewall 306-1, such as surface 422-1, that extends from an outer surface 420-1 of the first sidewall 306-1 to the cavity 601 (FIG. 6) that extends longitudinally within the multi-channel TOSA housing 206. Each of the plurality of second openings 412 may be coupled to a respective one of the plurality of laser packages 211-1 to 211-4 by way of welding rings 404, for example. Other approaches to coupling the plurality of laser packages 211-1 to 211-4 to the housing 206 are also within the scope of this disclosure and are not necessarily limited to welding. Each of the laser packages 211-1 to 211-4 may further include additional optical components for optically coupling to the multi-channel TOSA 210, and more specifically to the first light path 606 shown in FIG. 6. For example, the plurality of laser packages 211-1 to 211-4 may include an associated collimating lens 402 and focusing lens 406.

The multi-channel TOSA arrangement 210 may further include a plurality of optical component assemblies 310. The number of the optical component assemblies 310 is four, i.e., 310-1 to 310-4, but other embodiments are within the scope of this disclosure. The plurality of optical component assemblies 310-1 to 310-4 may be accurately understood to collectively form multiplexing optics, as discussed in further detail below with regard to FIGS. 5A-5D and 6. Each of the plurality of optical component assemblies 310-1 to 310-4 may include an optical component such as, for example, filters, mirrors or other suitable optics that enable channel wavelengths emitted by the laser assemblies 211-1 to 211-4 to be combined into a multiplexed signal for transmission purposes.

Figure 5A:
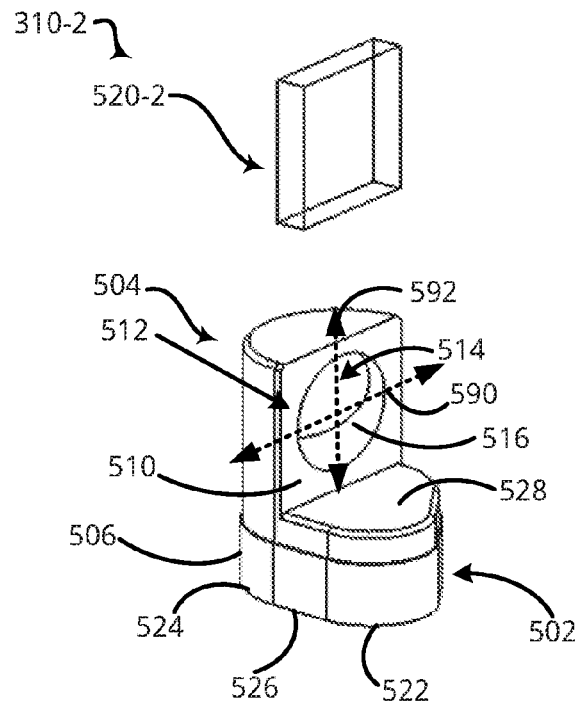
FIG. 5A shows an exploded view of an optical component assembly of the multi-channel arrangement TOSA of FIG. 3, in accordance with an embodiment of the present disclosure.

Since the structures of the optical component assemblies 310-1 to 310-4 are similar, only the optical component assembly 310-2 is described in detail as an example, and similar description of the optical component assemblies 310-1, 310-3 to 310-4 will be omitted for the sake of brevity. Turning to FIG. 5A, an exploded view of the optical component assembly 310-2 of the multi-channel arrangement TOSA of FIG. 3 is shown in accordance with an embodiment of the present disclosure. As shown, the optical component assembly 310-2 may include a base 502 and a vertical mount 504, which may also be referred to as a vertical mounting structure 504. The base 502 may also be referred to as a base portion 502 that is defined by at least one sidewall 506. The base 502 of the optical component assembly 310-2 may include a keyed shape, or asymmetric shape about the longitudinal axis 508, defined by a plurality of arcuate regions 522 and 524 such that the base 502 generally resembles, for example, a piriform shape, a teardrop shape, a pear shape, or the like. Other shapes and configurations for the base 502 are within the scope of this disclosure.

Figure 5B:
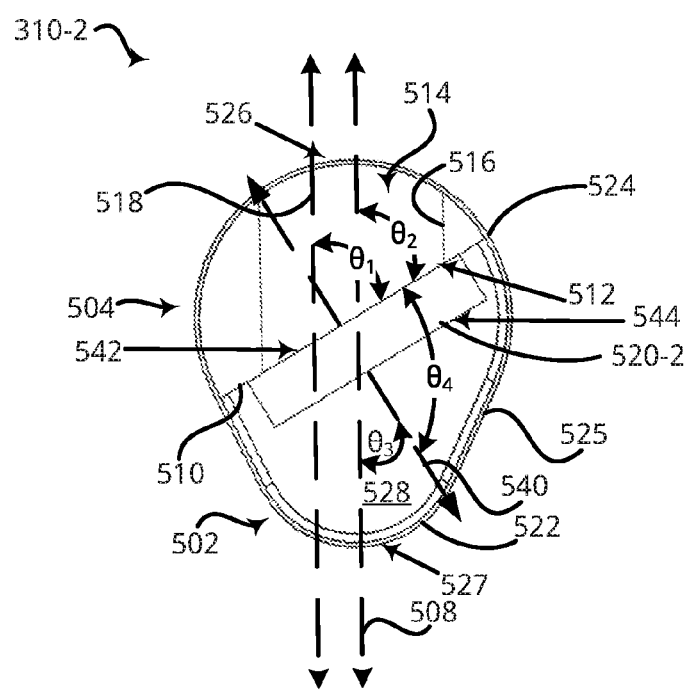
FIG. 5B shows a perspective view of the optical component assembly of the multi-channel arrangement TOSA of FIG. 3, in accordance with an embodiment of the present disclosure.

Turning to FIG. 5B, with additional reference to FIG. 5A, the at least one sidewall 506 extends from a first end 526 to a second end 527 of the base 502 along a longitudinal axis 508. As shown, the base 502 includes a shape defined by two arcuate regions 522 and 524 and a tapered region 525 extending therebetween. One of the arcuate regions 524 of the base 502 that is proximal/adjacent to the vertical mount 504 is wider (e.g., has a greater arc width) than the other arcuate region 522 of the base 502 that is distal from the vertical mount 504.

Continuing on, the vertical mount 504 is disposed on the base 502. The vertical mount 504 may be coupled to the base 502 using, for example, adhesives, welds, mechanical fits (e.g., threaded fits, friction fits, and the like), or any combinations thereof. In some cases, the vertical mount 504 and the base 502 may be a unitary (e.g., monolithic) body that is integrally formed, for example, by casting, molding, machining, or other suitable approach. As shown, the vertical mount 504 is coextensive with the base 502. Alternatively, the vertical mount 504 may be coextensive with a portion of the base 502, such as coextensive with the arcuate region 524.

The vertical mount 504 includes a mounting region 512, with the mounting region 512 including at least a first surface 510. The first surface 510 may also be accurately referred to as a mounting surface and may be configured to couple to one or more filters, mirrors, or other optical element. The first surface 510 includes a vertical axis 592 that extends substantially upright from the base 502, e.g., substantially 90 degrees relative to a line drawn generally along the longitudinal axis 508 of the base 502. Further, the first surface 510 includes a horizontal axis 590 that extends at an angle relative to the longitudinal axis 508 of the base 502. The horizontal axis 590 and vertical axis 592 of the first surface 510 may thus define the orientation of an optical axis 540 for a filter or other optical element coupled thereto, which is discussed in greater detail below.

The vertical mount 504 further forms a channel 514, which may also be referred to as a light guide or guide, defined by an inner surface 516 thereof. The channel 514 may be configured to allow light to pass through, and also pass through an optical element coupled to the first surface 510, and may further be configured to concentrate/confine light. Accordingly, the channel 514 may define an optical pathway 518 that is angled relative to the first surface 510 at a first angle $\theta_1$. In some cases, the first angle $\theta_1$ is substantially between 15 to 75 degrees. For example, the first angle $\theta_1$ may be about 60 degrees. Other angles for each of the optical components may be utilized and the provided examples should not be construed as limiting.

The optical component assembly 310-2 may further include an optical component 520-2 coupled to the mounting region 512 of the first surface 510 of the vertical mount 504. Accordingly, the optical component 520 may extend substantially upright, e.g., about 90 degrees±20 degrees, relative to a surface 528 of the optical component assembly 310-2. The optical component 520-2 may be thin-film WDM filter configured to selectively reflect particular channel wavelengths while passing others. Accordingly, the WDM filter may include long-pass and/or short pass filter capability depending on a desired configuration. In other embodiments, the optical component 520 may be at least one of a lens, a filter, and/or a mirror, for example, that enable channel wavelengths emitted by the laser assemblies 211 to be combined into a multiplexed signal for transmission purposes.

The mounting region 512, and by extension the first surface 510, may be angled relative to the longitudinal axis 508 of the base 502 at a second angle $\theta_2$, and the longitudinal axis 508 may be parallel to the optical pathway 518 such that the first angle $\theta_1$ may be substantially equal to the second angle $\theta_2$. The optical pathway 518 of the channel 514 may be substantially collinear/coaxial to the longitudinal axis 508 of the base 502, although the optical pathway 518 of the channel 514 may include other configurations which are also within the scope of this disclosure. For example, the optical pathway 518 may be transverse to that of the longitudinal axis 508. In an embodiment, the channel 514 is defined by a cylindrical through hole. Other embodiments are within the scope of this disclosure such as a grove or other partial structure without necessarily having a fully-enclosed channel. As further shown, the first surface 510 allows the filter 520-2 to have an optical axis 540, with the optical axis extending at an angle $\theta_4$ relative to the first surface 510, with angle $\theta_4$ being about 90 degrees, although other angles are within the scope of this disclosure. The optical axis 540 may also extend at an angle $\theta_3$ relative to the longitudinal axis 508, with the angle $\theta_4$ about 45 degrees.

Figure 5C:
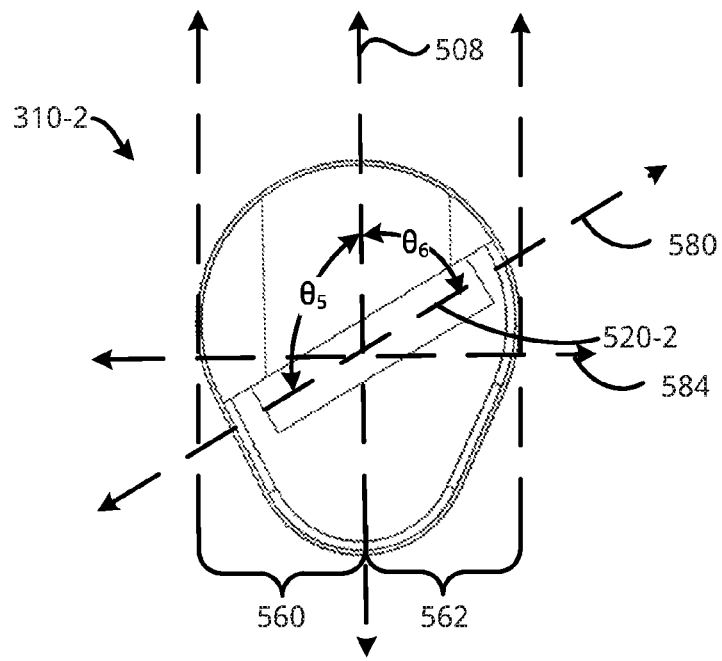
FIG. 5C shows top plan view of an optical component assembly of the multi-channel arrangement TOSA of FIG. 3 having a positive slope configuration, in accordance with an embodiment of the present disclosure.

Turning to FIG. 5C, with additional reference to FIGS. 5A and 5B, the optical component assembly 310-2 is shown in a first configuration in accordance with an embodiment of the present disclosure. As shown, the first configuration includes the filter 520-2 (or other optical element, as variously disclosed herein) angled in a diagonal manner relative to the longitudinal axis 508. In particular, the longitudinal axis 508 may define a first hemisphere 560 (or portion) and a second hemisphere 562. The filter 520-2 includes a longitudinal axis 580 that extends at least partially across each of the first and second hemispheres 560 and 562 and is substantially transverse to the longitudinal axis 508 of the optical component assembly 310-2. To this end, an obtuse angle $\theta_5$ is formed within the first hemisphere 560 between the longitudinal axis 508 of the optical component assembly 310-2 and the longitudinal axis 580 of the filter 520-2. The obtuse angle $\theta_5$ may measure between about 105 degrees and 165 degrees, for example. Likewise, an acute angle $\theta_6$ is formed within the second hemisphere 562 between the longitudinal axis 508 of the optical component assembly 310-2 and the longitudinal axis 580 of the filter 520-2. The acute angle $\theta_6$ may measure between about 15 degrees and 75 degrees, for example. This configuration may be referred to as a positive slope configuration whereby the filter 520-2 includes a positive (or upward) linear slope from the first hemisphere 560 to the second hemisphere 562 relative to cross-wise (or lateral) axis 584.

Figure 5D:
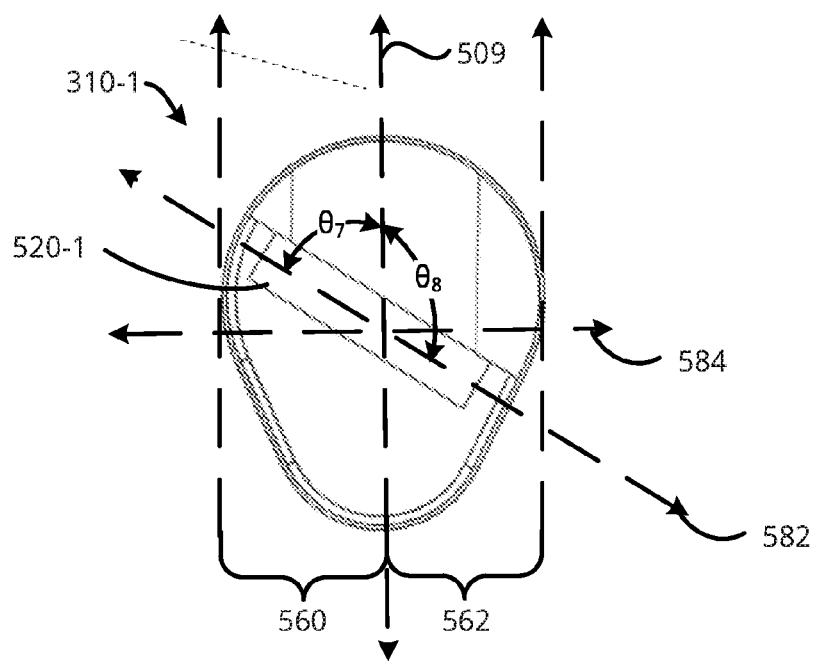
FIG. 5D shows top plan view of an optical component assembly of the multi-channel arrangement TOSA of FIG. 3 having a negative slope configuration, in accordance with an embodiment of the present disclosure.

Turning to FIG. 5D, with additional reference to FIGS. 5A-5C, the optical component assembly 310-1 is shown in a second configuration in accordance with an embodiment of the present disclosure. As shown, the second configuration includes the filter 520-1 angled in a diagonal manner relative to the longitudinal axis 508, similar to the optical component assembly 310-2 of FIG. 5C discussed above. However, in the second configuration, which may be understood to be essentially a mirror image of the first configuration, the first hemisphere 560 includes an acute angle $\theta_7$ between the longitudinal axis 508 of the optical component assembly 310-1 and the longitudinal axis 582 of the filter 520-1. Likewise, the second hemisphere 562 includes an obtuse angle $\theta_8$ between the longitudinal axis 508 of the optical component assembly 310-1 and the longitudinal axis 582 of the filter 520-1. This configuration may be referred to as a negative slope configuration whereby the filter 520-2 includes a negative (or downward) linear slope from the first hemisphere 560 to the second hemisphere 562 relative to cross-wise axis 584.

Returning to FIG. 5B, some aspects of the optical component assembly 310-2 may be best understood by way of an operational example. Although the following example is within the context of filter 310-2, and by extension a positive slope configuration, the example is equally applicable to other optical component assembly configurations including, for instance, the negative slope configuration of optical component assembly 310-1. During operation, a combination of the optical axis 540, optical path 518, channel (or light channel) 514 and filter 502-2 allows the optical component assembly 310-2 to receive light via two different paths and combine the same along a third path, which may also be referred to as an output path. For instance, a first light signal traveling along a direction generally following optical path 518 may encounter a first filter surface 542 by way of channel 514 that allows light to contact the first filter surface 542. In some scenarios, the filter 502-2 is configured to allow associated channel wavelengths to pass, and thus, one or more associated channel wavelengths of the first light signal may pass through the filter 502-2 with a minimal or otherwise minor amount of disruption or distortion, e.g., resulting from reflection/refraction of the one or more associated channel wavelengths.

At the same time, a second light signal traveling a path substantially transverse to that of the first light signal, e.g., 45 degrees relative to the optical axis 540, may encounter a second filter surface 544 of the filter 502-2. The angle $\theta_2$ of the filter 502-2 provides a corresponding angle of incidence for the second light signal, with the angle of incidence causing the same to reflect away from the second filter surface 544, e.g., substantially along the longitudinal axis 508 in the context of a 45 degree angle of incidence. The second light signal may include one or more channel wavelengths different than that of the first light signal. The filter 502-2 may be configured to pass associated wavelengths from the first light signal and reflect associated channel wavelengths from the second light signal in this manner. To this end, the optical component assembly 310-2 may multiplex one or more associated channel wavelengths from the first and second light signal and launch/direct the multiplexed channel wavelengths to an adjacent filter (e.g., optical component assembly 310-3) to multiplex additional channel wavelengths in a similar fashion and/or to couple the same to a transmit fiber. One specific example of such a multiplexing arrangement within a TOSA is shown and described in greater detail below with respect to the example embodiment of FIG. 6.

Turning now to FIG. 6, with additional reference to FIGS. 5A and 5B, a cross-sectional view of the multi-channel TOSA 110 having a plurality of optical component assemblies is shown in accordance with an embodiment of the present disclosure. As shown, the optical component assemblies 310 include two different configuration variations, namely optical component assemblies 310-1 and 310-4 in a first configuration, e.g., negative slope configuration, and optical component assemblies 310-2 and 310-3 in a second configuration, e.g., a positive slope configuration. To this end, the optical component assemblies 310-1 and 310-4 may be associated with a first group and the optical component assemblies 310-2 and 310-3 may be associated with a second group. The overall length L1 of the housing 202 measures about 10 mm and the overall width W1 measures about 3 mm, although other widths and lengths are within the scope of this disclosure.

The optical component assemblies 310 are configured to be inserted to the respective first openings 410, respectively. In this embodiment, for example, the base 502 of the optical component assembly 310-1 is configured to form a friction fit with the respective first opening 410-1 (FIG. 4) of the housing 202. The vertical mount 504 of the optical component assemblies 310 may pass through the first opening 410-1 and extend into the cavity 601.

The shapes of the first group and the second group of the optical component assemblies 310 are substantially similar and have the same first angles $\theta_1$ and second angles $\theta_2$ (FIG. 5B), but the first group is substantially a mirror image of the second group as previously discussed above with regard to FIGS. 5C and 5D. The first optical component assembly 310-1 includes a mirror component 520-1 configured to pass a substantial portion, e.g., at least 80%, of incident light emitted by the first laser assembly 211-1. Note that the optical component 310-1 may not necessarily utilize a mirror and may instead feature any other suitably reflective component such as a thin-film WDM filter. Continuing on, the second optical component assembly 310-2 may include a thin-film WDM filter 520-2 configured to pass channel wavelengths greater than 1310 nm and reflect wavelengths equal to or less than 1310 nm. The third optical component assembly 310-3 may include a thin-film WDM filter 520-3 configured to pass channel wavelengths greater than 1290 nm and reflect channel wavelengths less than or equal to 1290 nm. The fourth optical component assembly 310-4 may include a thin-film WDM filter 520-4 configured to pass channel wavelengths greater than 1270 nm and configured to reflect channel wavelengths less than or equal to 1270 nm.

Continuing with FIG. 6, the housing 206 of the multi-channel TOSA 110 defines the cavity 601 that extends longitudinally within the same. The cavity 601 further defines a first light path 606 that passes through each of the optical component assemblies 310-1 to 310-4. Each of the optical component assemblies 310-1 to 310-4 may be accurately referred to as multiplexing optics or a multiplexing optics arrangement. The cavity 601 also further defines a plurality of input light paths 610-1 to 610-4 that are configured to optically couple light having associated channel wavelengths emitted by each of the laser assemblies 211-1 to 211-4 to the first light path 606. The cavity 601 also further defines a second light path 608 that may extend substantially orthogonally relative to the first light path 606. The second light path 608 may pass through an isolator 640 and other associated optics of the optical coupling receptacle 220.

As previously discussed, openings of an optical subassembly housing allow an optical component assembly to be angled in a manner that supports a desired light path configuration. Within the context of FIG. 6, with additional reference to FIG. 4, the first opening 410-1 is oriented to reflect light received from the laser assembly 211-1 by way of input light path 610-1. In this case, the first opening 410-1 has the longitudinal axis 414-1 angled relative to an input light path 610-1 such that the first opening 410-1 has the first orientation. When the optical component assembly 310-1 is inserted into the first openings 410-1, the optical pathway of the channel 514 and the optical component 520-1, and more particularly an optical axis formed thereby, e.g., optical axis 540, are angled relative to the light path at a desired angle, that is, the third angle θ3. Accordingly, light received along the input light path 610-1 is reflected by the optical component assembly 310-1 at the third angle θ3 into the first light path 606 inside the cavity 601.

As further shown, and continuing with the example embodiment of FIG. 6, the optical component assemblies 310-2 and 310-3 are positioned in the same orientation by virtue of respective openings 410-2 and 410-3 having substantially the same second orientation, with the second orientation being shown by longitudinal axis 414-2 of the first and second openings 410-2 and 410-3. Therefore, the first and second orientations are different based on the longitudinal axis 414-1 of the first and fourth openings 410-1 and 410-4 being substantially transverse to the longitudinal axis 414-2 of the second and third openings 410-2 and 410-3. Accordingly, the optical component assemblies 310-1 to 301-4 have different orientations relative to their respective openings.

Moreover, while the first and fourth openings 410-1 and 410-4 include an longitudinal axis that extend in parallel, they each may provide, essentially, two sub-orientations, namely a first sub-orientation and a second sub-orientation, as the openings are mirror images. The sub-orientations allow for light to be directed in a particular desired direction, with first sub-orientation outputting light in a direction 90 degrees from a direction which the second sub-orientation output lights. For example, the first optical component assembly 310-1 outputs channel wavelengths along light path 606 towards the second optical component assembly 310-2. In contrast, the fourth optical component assembly 310-4 outputs channel wavelengths along the second light path 608 towards the external transmit fiber 630, with the second light path 608 being angled 90 degrees relative to the first light path 606. The direction of output channel wavelengths by an optical component assembly may thus be based at least in part on the particular orientation of the opening in addition to a particular sub-orientation.

Continuing on with FIG. 6, each of the optical component assemblies 310-1 to 310-4 is angled relative to a respective input light path 610-1 to 610-4 in order to reflect incident light and couple the same into the first light path 606. In an embodiment, as mentioned above, each optical component assembly 310-1 to 310-4 includes an optical component, such as optical components 520-1 to 520-4, configured at the same angle $\theta_3$ with $\theta_3$ measuring about 45 degrees±30 degrees. Other angles for each of the optical components 520-1 to 520-4 may be utilized and the provided examples should not be construed as limiting.

One specific example embodiment for the multi-channel TOSA 110 will now be discussed to further illustrate additional aspects of the same. In an embodiment, the first laser assembly 211-1 may be configured to emit 1330 nm channel wavelengths, the second laser assembly 211-2 may be configured to emit 1310 nm channel wavelengths, the third laser assembly 211-3 may be configured to emit 1290 nm channel wavelengths, and the fourth laser assembly 211-4 may be configured to emit 1270 nm channel wavelengths.

Thus, and in use, the first laser assembly 211-1 may emit light having 1330 nm channel wavelengths which is then coupled to the first light path 606 by way of the input light path 610-1 and the mirror component 520-1. Thus the portion of the first light path 606 prior to optical component assembly 310-2 may include light substantially having the first channel wavelength $\lambda_1$ of 1330 nm. The second laser assembly 211-2 may emit second light having 1310 nm channel wavelengths which is then coupled to the first light path 606 by way of the input light path 610-2 and the WDM thin-film filter component 520-2 that is configured to reflect channel wavelengths less than or equal to 1310 nm. The thin-film WDM filter component 520-2 may also selectively allow incident light having channel wavelengths greater than 1310 nm to pass thus producing light having both 1330 nm and 1310 nm channel wavelengths, e.g., $\lambda_1$, $\lambda_2$.

Continuing on, the third laser assembly 211-3 may emit third light having 1290 nm channel wavelengths which is then coupled to the first light path 606 by way of the input light path 610-3 and the thin-film WDM filter component 520-3 that is configured to reflect channel wavelengths less than or equal to 1290 nm. The WDM thin-film filter component 520-2 may also selectively allow incident light having channel wavelengths greater than 1310 nm to pass thus producing light having 1330 nm, 1310 nm and 1290 nm channel wavelengths, e.g., $\lambda_1$, $\lambda_2$, $\lambda_3$.

The fourth laser assembly 211-4 may emit light having 1270 nm channel wavelengths which is then coupled to the first light path 606 by way of the input light path 610-4 and the WDM thin-film filter component 520-4 that is configured to pass channel wavelengths less than or equal to 1270 nm. The WDM thin-film filter component 520-2 may also selectively reflect incident light having channel wavelengths greater than 1270 nm to pass thus producing light having 1330 nm, 1310 nm, 1290 nm, and 1270 nm channel wavelengths, e.g., $\lambda_1$, $\lambda_2$, $\lambda_3$, $\lambda_4$. The WDM thin-film filter component 520-4 may also optically couple/launch the multiplexed optical signal having each of channel wavelengths $\lambda_1$, $\lambda_2$, $\lambda_3$, $\lambda_4$ to the second light path 608. The second light path 608, in turn, may optically couple to an external transmit fiber 630 via the optical coupling receptacle, for transmission purposes.

The particular arrangement of optical components shown along the first light path 606 is designed to accommodate the particular channel wavelengths emitted by the laser assemblies 211-1 to 211-4. Accordingly, other laser assembly and optical component arrangements may be implemented with minor modification to launch a multiplexed optical signal along the first light path 606 and second light path 608. Thus the specific example scenarios and examples discussed herein should not be construed as limiting the present disclosure.

The third angle θ3 may be varied in other embodiments based on design requirements, and thus, the orientation of openings 410 may be varied accordingly without modification to a respective optical component assembly 310-1 to 301-4. In other words, the optical component assembly 310 may be used in different kinds of housings with varying light path configurations in order to reflect light at various angles so long as orientations of the openings 410 are adjusted accordingly. Thus, the optical subassemblies, consistent with implementations of the disclosure, facilitate production, assembly and alignment of the optical component assembly without the costs and complexities associated with maintaining varying different optical component assemblies.

Additional Example Embodiments

In accordance with an aspect of the present disclosure an optical subassembly is disclosed. The optical subassembly comprising at least one optical component assembly configured to be at least partially disposed within at least one first opening of an optical subassembly housing, the at least one optical component assembly comprising a base extending from a first end to a second end along a longitudinal axis, and a vertical mount disposed on the base and including a first surface that provides a mounting region to couple to an optical component, the first surface defining a vertical axis that extends substantially upright from the base and a horizontal axis that is angled relative to the longitudinal axis of the base at a first angle, the vertical mount further providing a channel that extends through the vertical mount, wherein the channel provides an optical pathway angled relative to the first surface at the first angle, the first angle being substantially between 15 and 75 degrees.

In accordance with another aspect of the present disclosure a multi-channel transmitter optical subassembly (TOSA) is disclosed. The multi-channel TOSA comprising a housing including a plurality of sidewalls that define a cavity and at least two first openings that extend into the cavity, and the at least two first openings having a substantially similar shape and having a first orientation and a second orientation, respectively, the first orientation being different than the second orientation, and at least two optical component assemblies configured to be at least partially disposed within respective ones of the at least two first openings of the housing, each of the at least two optical component assemblies comprising a base extending from a first end to a second end along a longitudinal axis, and a vertical mount disposed on the base and including a first surface that provides a mounting region to couple to an optical component, the first surface defining a vertical axis that extends substantially upright from the base and a horizontal axis that is angled relative to the longitudinal axis of the base at a first angle, the vertical mount further providing a channel that extends through the vertical mount, wherein the channel provides an optical pathway angled relative to the first surface at the first angle, the first angle being substantially between 15 and 75 degrees.

In accordance with another aspect of the present disclosure an optical transceiver module is disclosed. The optical transceiver module comprising a transceiver housing, a multi-channel transmitter optical subassembly (TOSA) disposed within the transceiver housing, the multi-channel TOSA comprising a plurality of sidewalls that define a cavity and a plurality of first openings that extends into the cavity, the first openings having a substantially similar shape and having a first orientation and a second orientation, respectively, the first orientation being different than the second orientation, a plurality of laser assemblies for generating at least a first channel wavelength and a second channel wavelength, respectively, each laser assembly optically coupled to the cavity such that light generated thereby is launched towards a first light path that extends substantially in parallel with a longitudinal axis of the cavity, and an optical multiplexing arrangement disposed within the cavity along the first light path, the optical multiplexing arrangement comprising at least a first optical component assembly and a second optical assembly that are at least partially disposed within respective openings of the plurality of first openings and aligned with the first light path based on the first and second orientations, respectively, and each of the first and second optical component assemblies comprising a base extending from a first end to a second end along a longitudinal axis, and a vertical mount disposed on the base and including a first surface that provides a mounting region to couple to an optical component, the first surface defining a vertical axis that extends substantially upright from the base and a horizontal axis that is angled relative to the longitudinal axis of the base at a first angle, the vertical mount further providing a channel that extends through the vertical mount, wherein the channel of the first optical component assembly is configured to allow light associated with a first channel wavelength to pass through the channel and the optical component of the first optical component assembly, and wherein the first optical component assembly reflects light associated with a second channel wavelength received along the first light path to launch a multiplexed signal having at least the first and second channel wavelength along an output light path, the output light path being substantially orthogonal to the first light path; and a receiver optical subassembly disposed within the transceiver housing.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:
1. An optical subassembly, comprising:
at least one optical component assembly configured to be at least partially disposed within at least one first opening of an optical subassembly housing, the at least one optical component assembly comprising:
a base extending from a first end to a second end along a longitudinal axis, wherein the base comprises at least one sidewall, the at least one sidewall extending from the first end to the second end of the base and defining an asymmetric shape about the longitudinal axis; and
a vertical mount disposed on the base and including a first surface that provides a mounting region to couple to an optical component, the first surface defining a vertical axis that extends substantially upright from the base and a horizontal axis that is angled relative to the longitudinal axis of the base at a first angle, the vertical mount further providing a channel that extends through the vertical mount, wherein the channel provides an optical pathway angled relative to the first surface at the first angle, the first angle being substantially between 15 and 75 degrees.

2. The optical subassembly of claim 1, wherein each optical component assembly comprises an optical component, the optical component being disposed on the mounting region of the vertical mount.

3. The optical subassembly of claim 1, wherein the optical component is a thin-film wavelength division multiplex (WDM) filter.

4. The optical subassembly of claim 1, wherein the at least one optical component assembly comprises a plurality of optical component assemblies.

5. The optical subassembly of claim 1, wherein the first surface is angled relative to the longitudinal axis of the base at a second angle, and wherein the longitudinal axis is parallel to the optical pathway such that the first angle is equal to the second angle.

6. The optical subassembly of claim 1, further comprising the optical subassembly housing, and wherein the base is configured to form a friction fit with the at least one first opening of the optical subassembly housing.

7. The optical subassembly of claim 6, wherein the optical subassembly housing includes a plurality of openings to couple to optical component assemblies, and wherein a shape of the base corresponds to a shape of each of the plurality of openings.

8. The optical subassembly of claim 7, wherein at least one opening of the plurality of openings includes a first orientation and at least one opening of the plurality of openings includes a second orientation, the first orientation being different than the second orientation.

9. A multi-channel transmitter optical subassembly (TOSA), comprising:
   a housing including a plurality of sidewalls that define a cavity and at least two first openings that extend into the cavity, and the at least two first openings having a substantially similar shape and having a first orientation and a second orientation, respectively, the first orientation being different than the second orientation; and
   at least two optical component assemblies configured to be at least partially disposed within respective ones of the at least two first openings of the housing, each of the at least two optical component assemblies comprising:
      a base extending from a first end to a second end along a longitudinal axis; and
      a vertical mount disposed on the base and including a first surface that provides a mounting region to couple to an optical component, the first surface defining a vertical axis that extends substantially upright from the base and a horizontal axis that is angled relative to the longitudinal axis of the base at a first angle, the vertical mount further providing a channel that extends through the vertical mount,
      wherein the channel provides an optical pathway angled relative to the first surface at the first angle, the first angle being substantially between 15 and 75 degrees.

10. The multi-channel TOSA of claim 9, wherein each optical component assembly of the at least two optical component assemblies comprise a respective optical component coupled to the vertical mount.

11. The multi-channel TOSA of claim 9, wherein each optical component is a thin-film wavelength division multiplex (WDM) filter.

12. The multi-channel TOSA of claim 9, wherein a first optical component of the at least two optical component assemblies includes a filter angled substantially transverse relative to the longitudinal axis of the base.

13. The multi-channel TOSA of claim 9, wherein the first surface of each of the least two optical component assemblies is angled relative to the longitudinal axis of the base at a second angle, and wherein the longitudinal axis is parallel to the optical pathway such that the first angle is equal to the second angle.

14. The multi-channel TOSA of claim 9, wherein the base of each of the least two optical component assemblies is configured to form a friction fit with an associated opening of the at least two first openings.

15. The multi-channel TOSA of claim 9, wherein the base of each of the least two optical component assemblies comprises at least one sidewall, the at least one sidewall extending from the first end to the second end of the base and defining an asymmetric shape about the longitudinal axis.

16. The multi-channel TOSA of claim 9, wherein a shape of the base of each of the least two optical component assemblies corresponds to a shape of each of the at least two first openings.

17. An optical transceiver module, comprising:
   a transceiver housing;
   a multi-channel transmitter optical subassembly (TOSA) disposed within the transceiver housing, the multi-channel TOSA comprising a plurality of sidewalls that define a cavity and a plurality of first openings that extends into the cavity, the first openings having a substantially similar shape and having a first orientation and a second orientation, respectively, the first orientation being different than the second orientation;
   a plurality of laser assemblies for generating at least a first channel wavelength and a second channel wavelength, respectively, each laser assembly optically coupled to the cavity such that light generated thereby is launched towards a first light path that extends substantially in parallel with a longitudinal axis of the cavity; and
   an optical multiplexing arrangement disposed within the cavity along the first light path, the optical multiplexing arrangement comprising at least a first optical component assembly and a second optical component assembly that are at least partially disposed within respective openings of the plurality of first openings and aligned with the first light path based on the first and second orientations, respectively, and each of the first and second optical component assemblies comprising:
      an optical component;
      a base extending from a first end to a second end along a longitudinal axis; and
      a vertical mount disposed on the base and including a first surface that provides a mounting region coupled to the optical component, the first surface defining a vertical axis that extends substantially upright from the base and a horizontal axis that is angled relative to the longitudinal axis of the base at a first angle, the vertical mount further providing a channel that extends through the vertical mount;
   wherein the channel of the first optical component assembly is configured to allow light associated with a first channel wavelength to pass through the channel and the optical component of the first optical component assembly, and wherein the first optical component assembly reflects light associated with a second channel wavelength received along the first light path to launch a multiplexed signal having at least the first and second channel wavelength along an output light path, the output light path being substantially orthogonal to the first light path; and a receiver optical subassembly disposed within the transceiver housing.

18. The optical transceiver module of claim 17, wherein the first angle is substantially between 15 to 75 degrees.

* * * * *